United States Patent
Wang et al.

(10) Patent No.: US 11,567,809 B2
(45) Date of Patent: Jan. 31, 2023

(54) ACCELERATING LARGE-SCALE IMAGE DISTRIBUTION

(71) Applicant: INTERNATIONAL BUSINESS MACHINES CORPORATION, Armonk, NY (US)

(72) Inventors: Yuan Wang, Nanjing (CN); Guang Cheng Li, Beijing (CN); Jing Min Xu, Beijing (CN); Xiao Xi Liu, Beijing (CN); Jian Ma, Beijing (CN); Lin Yang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 180 days.

(21) Appl. No.: 16/176,621

(22) Filed: Oct. 31, 2018

(65) Prior Publication Data
US 2020/0133740 A1   Apr. 30, 2020

(51) Int. Cl.
G06F 9/50 (2006.01)
G06N 5/02 (2006.01)

(52) U.S. Cl.
CPC ........... *G06F 9/5083* (2013.01); *G06N 5/022* (2013.01)

(58) Field of Classification Search
None
See application file for complete search history.

(56) References Cited

U.S. PATENT DOCUMENTS

| | | | |
|---|---|---|---|
| 2011/0072486 A1* | 3/2011 | Hadar | G06F 9/45558 726/1 |
| 2013/0339949 A1* | 12/2013 | Spiers | G06F 9/45558 718/1 |
| 2014/0229939 A1* | 8/2014 | Dias de Assuncao | G06F 9/45533 718/1 |
| 2014/0280433 A1 | 9/2014 | Messerli et al. | |
| 2015/0106810 A1* | 4/2015 | Ciano | G06F 9/45558 718/1 |
| 2016/0070602 A1* | 3/2016 | Shimogawa | G06F 9/45558 718/1 |
| 2016/0072910 A1* | 3/2016 | Eicher | H04L 67/325 709/213 |
| 2017/0093964 A1* | 3/2017 | Barzik | H04L 67/1097 |
| 2017/0149687 A1* | 5/2017 | Udupi | H04L 47/78 |
| 2017/0177877 A1* | 6/2017 | Suarez | G06F 16/188 |
| 2017/0180346 A1 | 6/2017 | Suarez et al. | |
| 2018/0088926 A1 | 3/2018 | Abrams | |
| 2018/0096005 A1 | 4/2018 | Nagaraja et al. | |

(Continued)

OTHER PUBLICATIONS

Hu, "Deadline-Aware Deployment for Time Critical Applications in Clouds", 2017, Euro-Par2017: Euro-Par 2017: Parallel Processing pp. 345-357 (Year: 2017).*

(Continued)

*Primary Examiner* — Wynuel S Aquino
(74) *Attorney, Agent, or Firm* — Tutunjian & Bitetto, P.C.; Joseph Petrokaitis

(57) ABSTRACT

Methods and systems for deploying images to computing systems include predicting an environment for a plurality of processing nodes. Image deployment to the plurality of processing nodes is simulated to determine a subset of the plurality of processing nodes for deployment. One or more images is pre-loaded to the subset of the plurality of processing nodes in advance of a deployment time.

17 Claims, 6 Drawing Sheets

(56) References Cited

U.S. PATENT DOCUMENTS

2018/0365036 A1* 12/2018 Toal .................... G06F 9/30047
2019/0253490 A1* 8/2019 Du ...................... H04L 67/1008

OTHER PUBLICATIONS

Zhang, "Speeding Up VM Startup by Cooperative VM Image Caching", Jan. 2018, IEEE (Year: 2018).*

Alvaro Lopez Garcia, "Efficient image deployment in cloud environments", Elsevier Ltd (Year: 2016).*

Senthil Nathan et al., CoMICon: A Co-operative Management System for Docker Container Images, 2017 IEEE International Conference on Cloud Engineering (IC2E), Vancouver, BC, Apr. 2017.

Mingyuan Liang et al., HDID: An Efficient Hybrid Docker Image Distribution System for Datacenters, Software Engineering and Methodology for Emerging Domains. NASAC 2016. Communications in Computer and Information Science, vol. 675. Springer, Singapore, First Online Jan. 2017.

Zhaoning Zhang et al., VMThunder: Fast Provisioning of Large-Scale Virtual Machine Clusters, IEEE Transactions on Parallel and Distributed Systems, vol. 25, No. 12, Dec. 2014.

\* cited by examiner

US 11,567,809 B2

ACCELERATING LARGE-SCALE IMAGE DISTRIBUTION

BACKGROUND

Technical Field

The present invention generally relates to cloud computing systems and, more particularly, to the efficient distribution of images across distributed computing networks.

Description of the Related Art

Platform as a Service (PaaS) systems provide rapidly provisioned computing solutions for diverse workloads on an as-needed basis. Such PaaS systems may have a set of different processing nodes, each of which can be provisioned with a different set of images or "containers" that provide the software needed for workload execution. The PaaS systems may also include a registry system that stores, distributes, and manages those images, sending the images to processing nodes when requested.

The PaaS system may make determinations as to which processing nodes will be implemented at runtime, with the end-user having little control. This can pose a challenge to the user in provisioning during a tightly constrained window, such as a planned maintenance window, as a workload may call for the provisioning of many thousands of processing nodes. This creates a bandwidth bottleneck, consuming a large amount of the time in the window simply by transmitting the images.

SUMMARY

A method for deploying images to computing systems includes predicting an environment for a plurality of processing nodes. Image deployment to the plurality of processing nodes is simulated to determine a subset of the plurality of processing nodes for deployment. One or more images is pre-loaded to the subset of the plurality of processing nodes in advance of a deployment time.

An image pre-deployment system includes an environment prediction module configured to predict an environment for a plurality of processing nodes. A simulation module is configured to simulate image deployment to the plurality of processing nodes to determine a subset of the plurality of processing nodes for deployment. A pre-load module is configured to pre-load one or more images to the subset of the plurality of processing nodes in advance of a deployment time.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention accelerate image distribution to the processing nodes in a Platform as a Service (PaaS) system by predicting which processing nodes will be selected by the PaaS management system and triggering distribution of images to those processing nodes in advance of an a predetermined window. Any nodes that incorrectly download the image can simply discard it, while any nodes that should have had the image can download it with less competition for bandwidth. This preloading process substantially reduces the amount of time needed to provision processing nodes, reducing downtime and increasing the likelihood that provisioning can be completed within the predetermined window.

Figure 1:
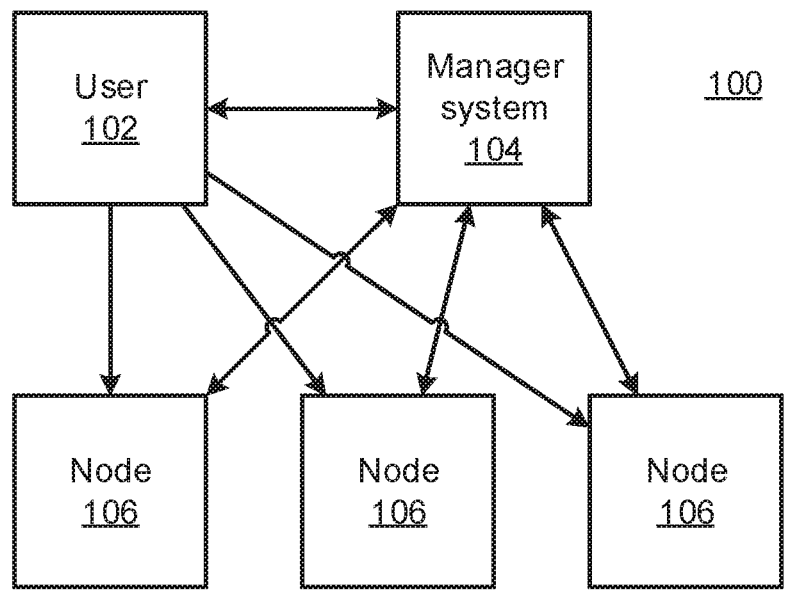
FIG. 1 is a block diagram of a distributed Platform as a Service computing system with image pre-loading in accordance with an embodiment of the present invention.

Referring now to FIG. 1, a diagram of a PaaS system 100 is shown. A user 102 has a workload for execution on a distribution computing platform. The user 102 communicates with a manager system 104 and provides information regarding the workload, including the number and type of processing nodes 106 that will be needed to execute the workload. The information provided to the manager system 104 includes, for example, a number of processing nodes 106, a processor type, an operating system, an execution environment, storage capacity, random access memory capacity, network bandwidth, and any other points that may be needed for the workload. The user 102 can furthermore provide particular images or containers to the manager system 104 for storage in a registry there. It should be understood that the PaaS system 100 can include many thousands of processing nodes 106, each of which can be idle or busy in accordance with the workloads being executed by the PaaS system 100 at any given time. It should also be understood that, although a single manager system 104 is shown, there can be multiple such manager systems 104, with multiple registries distributed across the PaaS system 100. While this can reduce the problem of limited bandwidth at the registry by providing alternative image sources, very large deployments will still cause delays. Furthermore, although the manger system 104 is shown as being a single device, it should be understood that scheduling can be performed at a separate location from the image registry.

Before and during execution of the workload, the manager system 104 determines which processing nodes 106 will use which images. The manager system 104 thus distributes images to the processing nodes 106 according to its own internal logic, for example based on node and resource availability at the time of provisioning. The manager system 104 and the PaaS system 100 can handle multiple different workloads from multiple different users 102, such that the availability of particular resources will depend on what is happening in the PaaS system 100 generally.

Because the manager system 104 may need to transmit images to many different processing nodes 106, bandwidth is a significant limitation on the provisioning process. Provisioning, as the term is used herein, refers to the process by which resources in a PaaS system 100 are allocated to a user 102 and are prepared for execution. Thus, provisioning includes the determinations made by the manager system 104 as to which processing elements 106 will be used for the workload as well as the transmission of images and any configuration steps that are needed to prepare the processing nodes 106 for execution of the workload. For provisioning to be completed within a predetermined time window, such as within a planned maintenance window of, e.g., two hours, all steps of the provisioning need to be completed before the window expires.

To accelerate the provisioning process, the user 102 makes a prediction as to which processing elements 106 will be selected by the manager system 104. This prediction is based on historical data that can include usage statistics for the PaaS system 100. The user 102 then communicates with the nodes 106 to trigger a preemptive download of the images in question from the manger system 104. This pre-loading process can be executed at any time without substantially affecting the execution of any workloads on the processing nodes 106. The pre-loading should be performed sufficiently in advance to be completed before the predetermined time window, but not so far in advance that confidence in the prediction is lost.

The processing nodes 106 thus communicate with the manager system 104 to request the images specified by the user 102. After pre-loading, when the manager system 104 makes its final provisioning determinations and selects processing nodes 106 for execution of the user's workload, the nodes 106 will proceed to cure any deficiencies in the prediction, with inaccurately included processing nodes 106 discarding the unneeded image(s) and with inaccurately omitted processing nodes 106 downloading the image(s) from the manager system 104. The processing nodes 106 selected by the manager system 104 then install the images and perform any configuration needed for the workload. Execution can then proceed, triggered by the manager system 104, by the user 102, or by any other appropriate source.

It is to be understood in advance that, although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Figure 2:
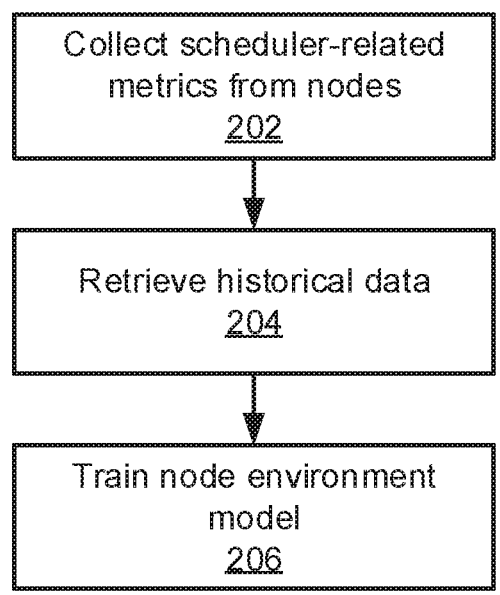
FIG. 2 is a block/flow diagram of a method for training an environment model that is used to predict the status of processing nodes at a future time in accordance with an embodiment of the present invention.

Referring now to FIG. 2, a method for training a processing node environment model is shown. Block 202 collects scheduler-related metrics from the processing nodes 106. These metrics are factors that a manager system 104 will use to decide which nodes to run the workload and can include such factors as processor usage, memory and swap usage, disk space usage, network bandwidth usage, and more in-depth resource consumption metrics such as file system inode usage, number of processes, number of open files, and number of open sockets. Block 204 retrieves historical data that includes, for example, previously collected metrics over a period of time. For example, block 204 may access processor usage over a period of the previous month. The length of time accessed for the historical data is set to balance the additional training effectiveness provided by the additional data against the additional computational burden of training based on a larger training dataset.

Block 206 trains a node environment model using the historical data. The node environment model can be used to predict which processing nodes 106 will be selected by the manager system 104 for future deployments. The term "environment" refers to the processing nodes 106 and the environment model represents a predictor for node status changes that incorporates resource consumption trends and user activity patterns. The node environment model can be implemented, for example, as any appropriate machine learning model such as a neural network. Block 206 thus trains the node environment model using a set of training data that is split into a training set and a verification set, with the training set being used to train the initial model and with the verification set being used to ascertain any errors in the predictions of the trained model.

Figure 3:
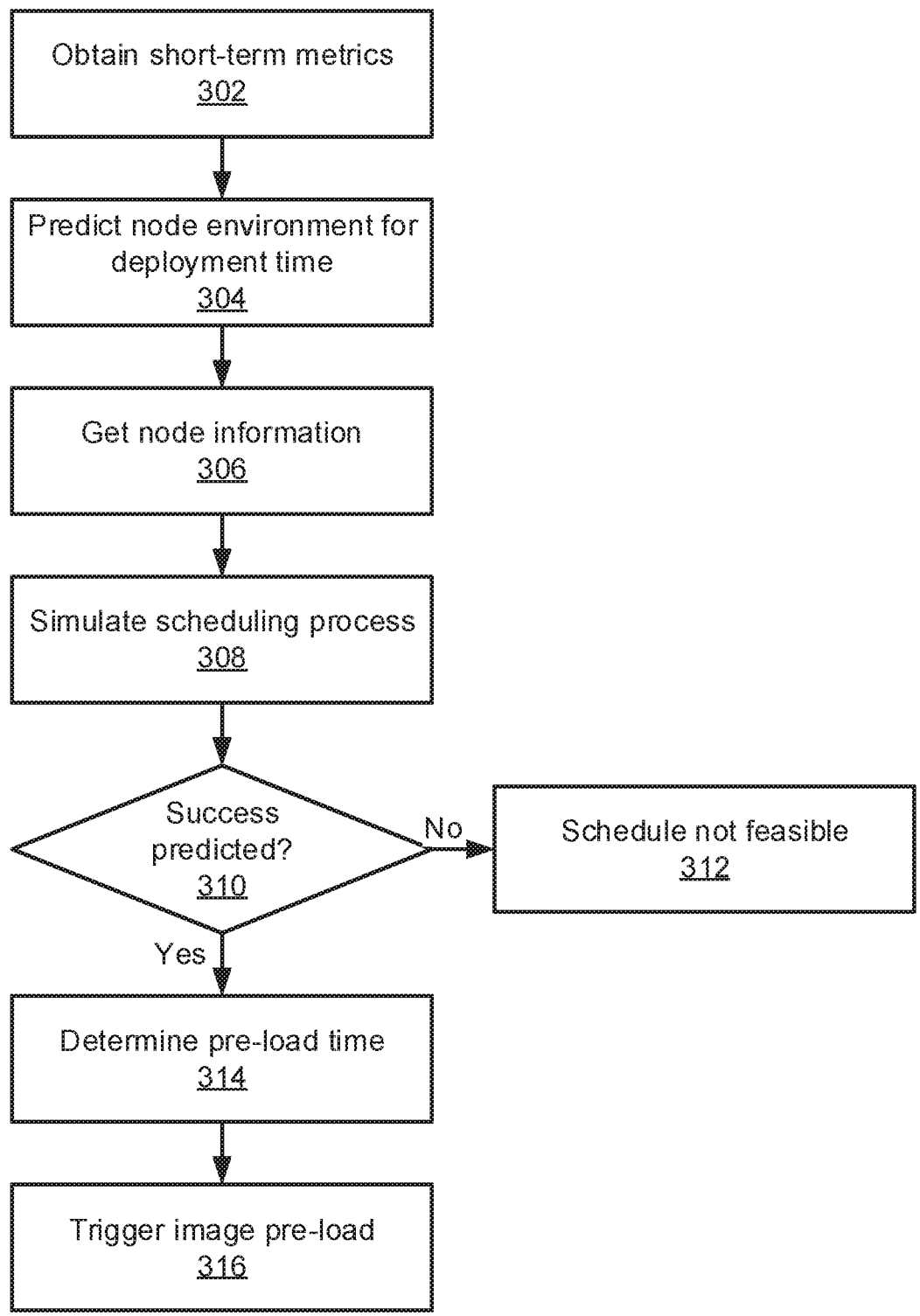
FIG. 3 is a block/flow diagram of a method for pre-loading images to processing nodes in a distributed Platform as a Service computing system in accordance with an embodiment of the present invention.

Referring now to FIG. 3, a method for pre-loading images is shown. Block 302 obtains short-term metrics from the processing nodes 106. These metrics can be the same metrics as the scheduler-related metrics described above with respect to blocks 202 and 204, but collected over a shorter period of time to reflect recent conditions. Block 304 predicts the node environment using the previously trained node environment model and the short-term metrics to predict the processing node environment at a planned deployment time.

Block 306 gets node information from the manager system 104. This node information is information that describes the processing nodes 106, for example including how much processor capacity, memory capacity, storage capacity, and network bandwidth each processing node 106 has access to.

Using the node information and the predicted node environment, block 308 simulates the scheduling process of the manager system 104. If the scheduling process simulation is not successful at block 310, then block 312 determines that the schedule may not be feasible and informs user 102. The failure of the scheduling process simulation indicates that it was not possible to find appropriate processing nodes 106 to run the workload with the predicted resources. This condition can result from misconfiguration of the workload. Block 312 therefore lets the user make corrective changes to the configuration to avoid actual scheduling failures at deployment time.

If the scheduling simulation is successful, then block 314 uses the simulated schedule output, along with network bandwidth needs for image deployment, and determines an amount of time needed to pre-load the image(s) on processing nodes 106. Block 316 triggers the individual processing nodes 106 to then pre-load the image(s) before the deployment start time.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
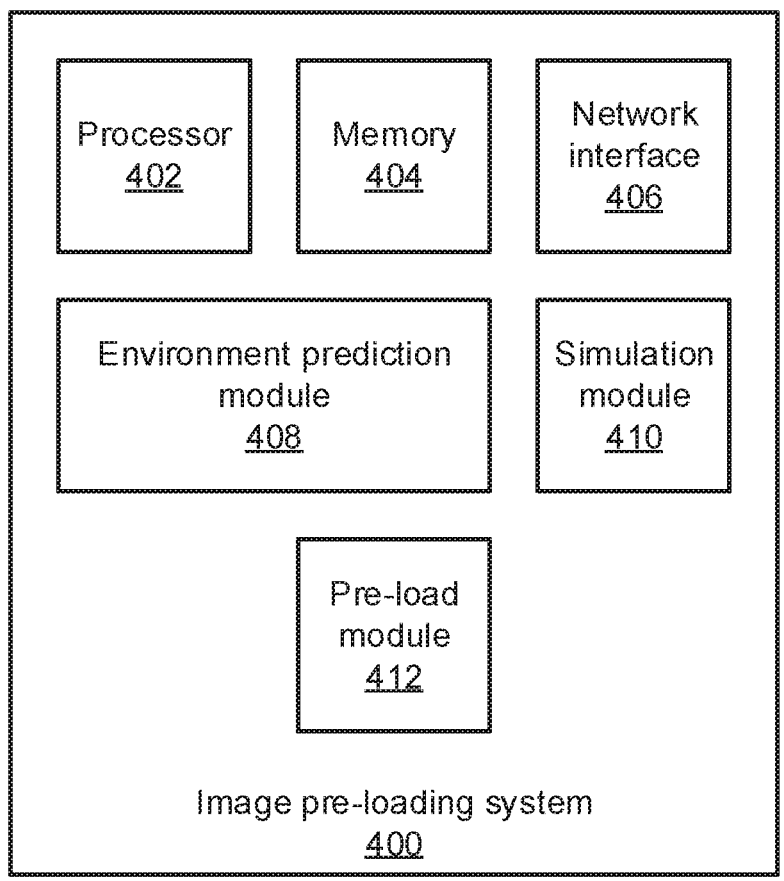
FIG. 4 is a block diagram of an image pre-loading system that predicts which processing nodes will be provisioned with particular images and pre-loads those images in advance of a deployment time in accordance with an embodiment of the present invention.

Referring now to FIG. 4, an image pre-loading system 400 is shown. It is specifically contemplated that the image pre-loading system 400 may be collocated with the user 102, but it should be understood that the image pre-loading system 400 may instead be a separate system that interfaces with the manager system 104 and the processing nodes 106. The image pre-loading system 400 includes a hardware processor 402 and a memory 404, as well as a network interface 406 that is configured to communicate with the processing nodes 106 and the manager system 104 by any appropriate communications medium and protocol. The image pre-loading system 400 also includes functional modules that may each, in some embodiments, be implemented as software that is stored in memory 404 and executed by hardware processor 402. In other embodiments, some or all of the functional modules can be implemented as one or more discrete hardware components in the form of, e.g., application-specific integrated chips or field programmable gate arrays.

An environment prediction module 408 collects scheduler-related metrics and historical data to train a node environment model and uses that model, along with short-term metrics, to predict the processing node environment at a given deployment time. A simulation module 410 collects processing node information and uses the predicted node environment as well as any other factors (such as bandwidth availability and needs) to simulate a deployment according to a user's request. The simulation provides a timetable for the deployment that pre-load module 412 uses to time the pre-loading of the image(s) at the processing nodes 106, providing instructions to the processing nodes 106 to trigger the download in advance of the deployment time.

Figure 5:
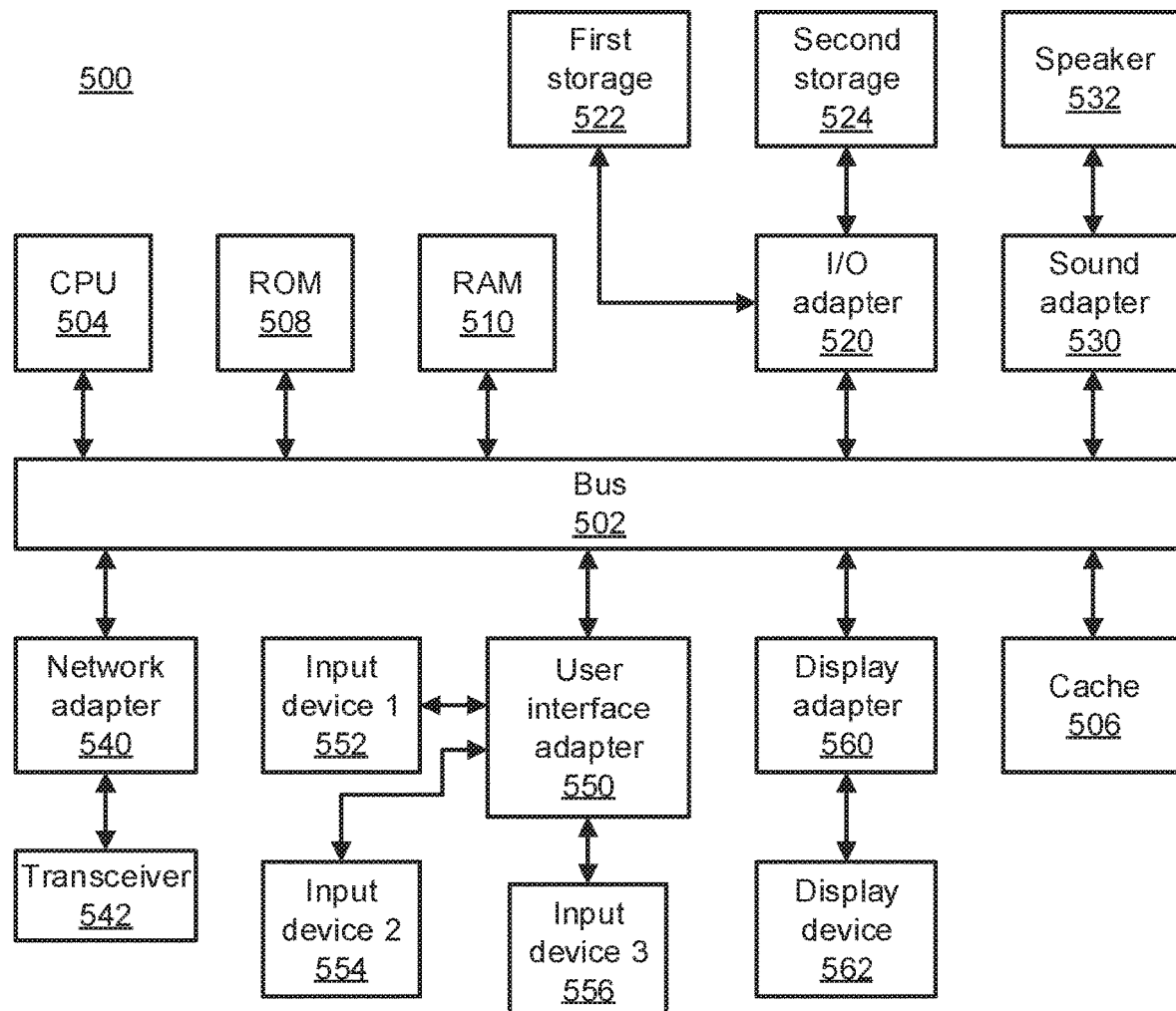
FIG. 5 is a block diagram of a processing system in accordance with an embodiment of the present invention.

Referring now to FIG. 5, an exemplary processing system 500 is shown which may represent the image pre-loading system 400. The processing system 500 includes at least one processor (CPU) 504 operatively coupled to other components via a system bus 502. A cache 506, a Read Only Memory (ROM) 508, a Random Access Memory (RAM) 510, an input/output (I/O) adapter 520, a sound adapter 530, a network adapter 540, a user interface adapter 550, and a display adapter 560, are operatively coupled to the system bus 502.

A first storage device 522 and a second storage device 524 are operatively coupled to system bus 502 by the I/O adapter 520. The storage devices 522 and 524 can be any of a disk storage device (e.g., a magnetic or optical disk storage device), a solid state magnetic device, and so forth. The storage devices 522 and 524 can be the same type of storage device or different types of storage devices.

A speaker 532 is operatively coupled to system bus 502 by the sound adapter 530. A transceiver 542 is operatively coupled to system bus 502 by network adapter 540. A display device 562 is operatively coupled to system bus 502 by display adapter 560.

A first user input device 552, a second user input device 554, and a third user input device 556 are operatively coupled to system bus 502 by user interface adapter 550. The user input devices 552, 554, and 556 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 552, 554, and 556 can be the same type of user input device or different types of user input devices. The user input devices 552, 554, and 556 are used to input and output information to and from system 500.

Of course, the processing system 500 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present principles provided herein.

Figure 6:
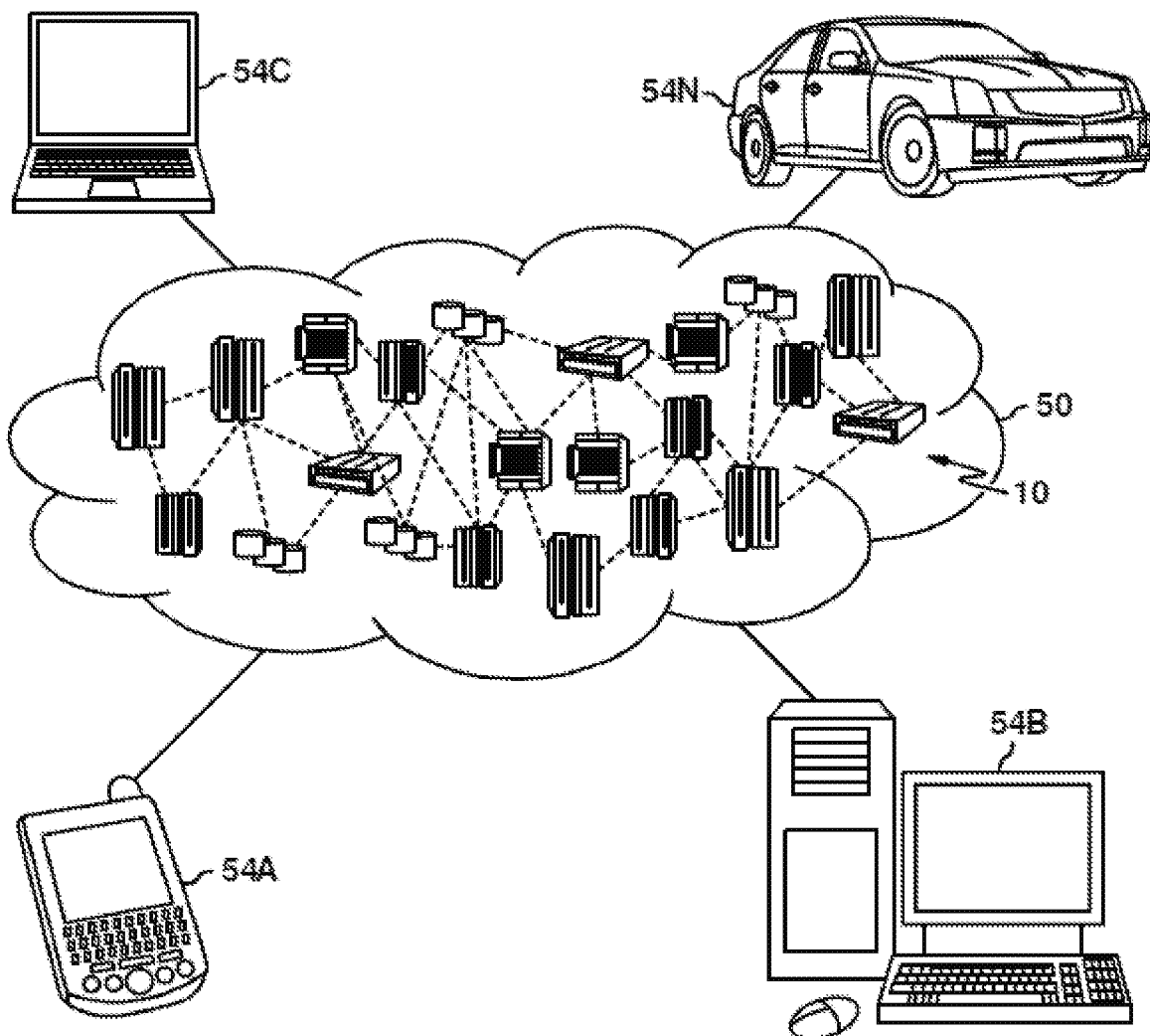
FIG. 6 is a diagram of a cloud computing environment according to the present principles.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
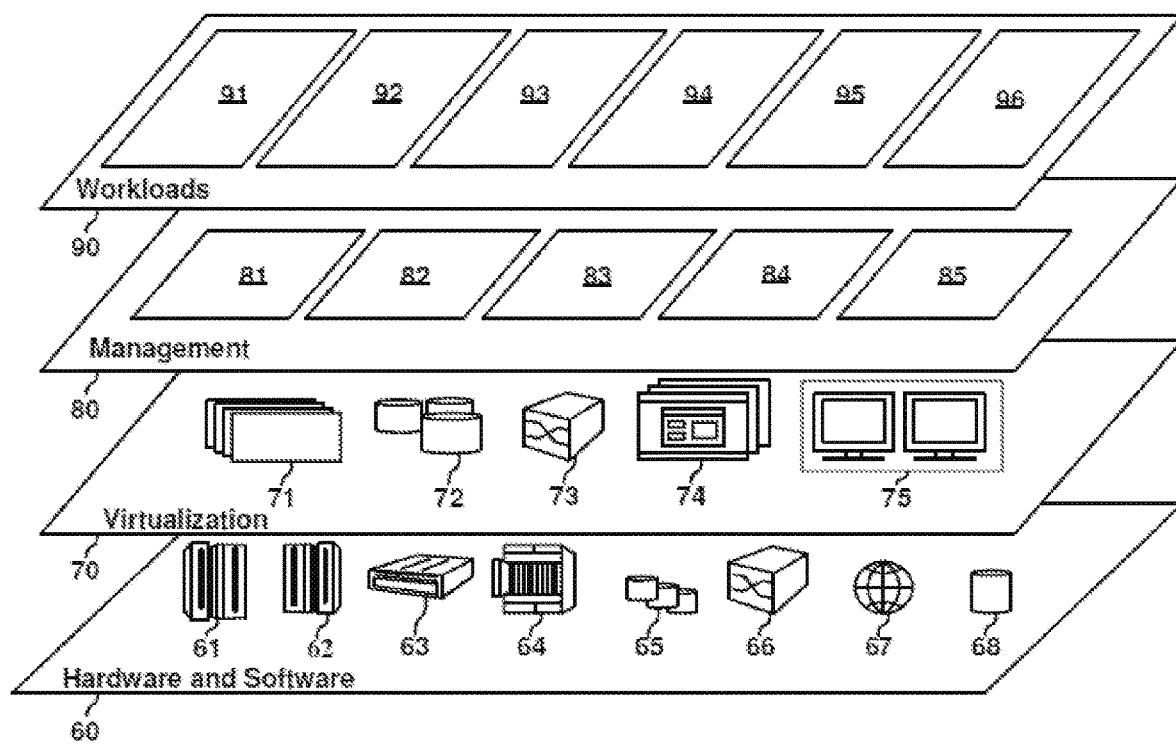
FIG. 7 is a diagram of abstraction model layers according to the present principles.

Referring now to FIG. 7, a set of functional abstraction layers provided by cloud computing environment 50 (FIG. 6) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image pre-loading 96.

Having described preferred embodiments of accelerating large-scale image distribution (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for deploying images to computing systems, comprising:
   predicting an environment for a plurality of processing nodes;
   simulating image deployment to the plurality of processing nodes to determine a subset of the plurality of processing nodes for deployment, including predicting which processing nodes will be selected by a management system at a deployment time; and
   pre-loading one or more images to the subset of the plurality of processing nodes, including the processing nodes predicted to be selected by the management system, as determined by the simulation, in advance of the deployment time; and
   based upon the simulated image deployment, perforn a corrective action comprising:
      determining one or more processing nodes that were not part of the subset determined by simulating image deployment, but were selected at the deployment time; and
      loading the one or more images, at the deployment time, to the determined one or more processing nodes that were not, at the deployment time, part of the subset determined by simulating image deployment.

2. The computer--implemented method of claim 1, wherein the one or more images comprise software that is deployed to processing nodes to enable the processing nodes to execute a workload.

3. The computer-implemented method of claim 2, further comprising executing the workload after deployment.

4. The computer-implemented method of claim 1, further comprising trainig a node environment prediction model based on historical data and metrics from each of the plurality of processing nodes.

5. The computer-implemented method of claim 4, wherein predicting the environment for the plurality of processing modes comprises using the environment prediction model to predict a status of the of each of the plurality of processing nodes at the deployment time.

6. The computer-implemented method of claim 4, wherein the metrics comprise operational resource consumption statistics.

7. The computer-implemented method of claim 1, wherein simulating the image deployment comprises predicting that image deployment would be unsuccessful and changing a configuration of the one or more images to ensure successful deployment.

8. The computer-implemented method of claim 1, wherein pre-loading the one or more images to the subset of the plurality of processing nodes comprises instructing each processing node in the subset to download the one or more images from an image registry.

9. A non-transitory computer readable storage medium comprising a computer readable program for deploying images to computing systems, wherein the computer readable program when executed on a computer causes the computer to perform the steps of:
   predicting an environment for a plurality of processing nodes;
   simulating image deployment to the plurality of processing nodes to determine a subset of the plurality of processing nodes for deployment, including predicting which processing nodes will be selected by a management system at a deployment time;
   pre-loading one or more images to the subset of the plurality of processing nodes, including the processing nodes predicted to be selected by the management system, as determined by the simulation, in advance of the deployment time; and,
   based upon the simulated image deployment, performing a corrective action comprising:
      determining one or more processing nodes that were not part of the subset determined by simulating image deployment, but were selected at the deployment time; and
      loading the one or more images, at the deployment time, to the determined one or more processing nodes that were not, at the deployment time, part of the subset determined by simulating image deployment.

10. An image pre-deployment system, comprising:
   an environment prediction module configured to predict an environment for a plurality of processing nodes;
   a simulation module configured to simulate image deployment to the plurality of processing nodes to determine a subset of the plurality of processing nodes for deployment, including a prediction of which processing nodes will be selected by a management system at a deployment time; and
   a pre-load module configured to pre-load one or more images to the subset of the plurality of processing nodes, including the processing nodes predicted to be selected by the management system, as determined by the simulation, in advance of the deployment time, and, based upon the simulated image deployment, to perform a corrective action that includes a termination of one or more processing nodes that were not part of the subset determined by simulating image deployment, but were selected at the deployment time, and loading of the one or more images, at the deployment time, to the determined one or more processing nodes that were not, at the deployment time, part of the subset determined by simulating image deployment.

11. The system of claim 10, wherein the one or more images comprise software that is deployed to processing nodes to enable the processing nodes to execute a workload.

12. The system of claim 10, wherein the environment prediction module is further configured to train a node environment prediction model based on historical data and metrics from each of the plurality of processing nodes.

13. The system of claim 12, wherein the metrics comprise operational resource consumption statistics.

14. The system of claim 12, wherein the environment prediction module is further configured to use the environment prediction model to predict a status of the of each of the plurality of processing nodes at the deployment time.

15. The system of claim 10, wherein the simulation module is further configured to predict that image deployment would be unsuccessful and to change a configuration of the one or more images to ensure successful deployment.

16. The system of claim 10, wherein the pre-load module is further configured to instruct each processing node in the subset to download the one or more images from an image registry.

17. The system of claim 10, wherein the plurality of processing nodes are processing nodes within a Platform as a Service cloud computing system.

* * * * *